US010850660B2

(12) United States Patent
Abood

(10) Patent No.: US 10,850,660 B2
(45) Date of Patent: Dec. 1, 2020

(54) STRAP LOCATING ARRANGEMENT

(71) Applicant: Ralph Justin Abood, NSW (AU)

(72) Inventor: Ralph Justin Abood, NSW (AU)

(*) Notice: Subject to any disclaimer, the term of this patent is extended or adjusted under 35 U.S.C. 154(b) by 170 days.

(21) Appl. No.: 15/777,183

(22) PCT Filed: Oct. 28, 2016

(86) PCT No.: PCT/AU2016/051029
§ 371 (c)(1),
(2) Date: May 17, 2018

(87) PCT Pub. No.: WO2017/083908
PCT Pub. Date: May 26, 2017

(65) Prior Publication Data
US 2018/0326894 A1 Nov. 15, 2018

(30) Foreign Application Priority Data
Nov. 17, 2015 (AU) ................................ 2015258181

(51) Int. Cl.
*B60P 7/08* (2006.01)
*B65H 49/20* (2006.01)

(52) U.S. Cl.
CPC ............ *B60P 7/0853* (2013.01); *B65H 49/20* (2013.01)

(58) Field of Classification Search
CPC ............................. B60P 7/0853; B65H 49/20
USPC ........................................................ 410/98
See application file for complete search history.

(56) References Cited

U.S. PATENT DOCUMENTS

| 3,178,790 | A | * | 4/1965 | Cech | B60P 7/0815 |
| | | | | | 410/116 |
| 3,817,474 | A | * | 6/1974 | Board | B60R 22/353 |
| | | | | | 242/381.4 |
| 3,910,558 | A | * | 10/1975 | Brucker | B60P 7/083 |
| | | | | | 410/103 |
| 8,915,685 | B2 | * | 12/2014 | Flores | B65B 13/181 |
| | | | | | 410/99 |
| 9,126,521 | B1 | * | 9/2015 | McCullough | B60P 7/083 |
| 10,406,965 | B1 | * | 9/2019 | Johnson | B60P 7/0853 |
| 2006/0153657 | A1 | * | 7/2006 | Goulet | B60P 7/0846 |
| | | | | | 410/99 |
| 2008/0178440 | A1 | * | 7/2008 | Douglas | B60P 7/0853 |
| | | | | | 24/68 CD |

(Continued)

FOREIGN PATENT DOCUMENTS

| AU | 2007203097 | 1/2009 |
| SE | 0002829-0 | 6/2002 |

*Primary Examiner* — Hilary L Gutman
(74) *Attorney, Agent, or Firm* — WPAT, P.C., Intellectual Property Attorneys; Anthony King

(57) ABSTRACT

The present invention relates to a strap locating arrangement, configured for allowing drivers of large vehicles to locate strapping over especially high loads on a vehicle load bed or to locate strapping through gaps between the top of their loads and the bottom of the vehicle roof, including a receiving arrangement configured for receiving at least part of a rolled up load securing strap; the receiving arrangement including a slot through which an un-rolled portion of the load securing strap is extendable in a direction extending tangentially outward from the rolled up strap; the receiving arrangement being attachable to an elongate extension member.

19 Claims, 7 Drawing Sheets

(56) References Cited

U.S. PATENT DOCUMENTS

2010/0028100 A1\* 2/2010 Lampman ............. B60P 7/0853
　　　　　　　　　　　　　　　　　　　　　410/156
2015/0047621 A1\* 2/2015 Palladino ............. A63B 65/122
　　　　　　　　　　　　　　　　　　　　　124/5

\* cited by examiner

STRAP LOCATING ARRANGEMENT

FIELD OF THE INVENTION

The present invention relates to strap locating arrangement and in particular to a strap locating arrangement for assisting vehicle drivers in strapping loads to a load bed.

BACKGROUND OF THE INVENTION

At present, when truck drivers have goods loaded on their vehicles, they may be required to secure it with strapping in order to prevent it from moving around and/or falling off the vehicle load bed. Strapping is typically arranged over the top of the load, and tightened up using a ratchet type arrangement or similar.

Before the strapping can be tightened up, it must be arranged to extend over the top of the load. This typically involves throwing a large heavy strap with an associated heavy metal D-link connector on the end over the top of the load. A falling connector and strap can be hazardous to people or equipment on the other side of the load, and if thrown incorrectly, can damage the load itself.

Further, where the load is located within a vehicle compartment with open sides, and having a relatively small distance between the bottom of the compartment and the top of the load, this makes the locating of the strapping and connector over the load particularly difficult.

It is to be understood that, if any prior art information is referred to herein, such reference does not constitute an admission that the information forms part of the common general knowledge in the art, in Australia or any other country.

SUMMARY OF THE INVENTION

The present invention provides a strap locating arrangement which overcomes or at least partially ameliorates some of the abovementioned disadvantages or which at least provides the public with a useful choice.

According to a first aspect, there is provided a strap locating arrangement for locating a strap over a load on a vehicle load bed, the strap locating arrangement comprising
  a. a receiving arrangement configured for receiving at least part of a rolled up load securing strap, the receiving arrangement comprises an elongate and straight base wall having parallel opposed edges and a pair of side walls extending substantially upwardly from the elongate and straight base wall at the opposed edges, the elongate and straight base wall and the pair of side walls defining an elongate and straight channel to receive the rolled up load securing strap and guide rolling of the rolled up load securing strap on the elongate and straight base wall in operation;
  b. the receiving arrangement including a slot through which an un-rolled portion of the load securing strap is extendable in a direction extending tangentially outward from the rolled up strap;
  c. the receiving arrangement being attachable to an elongate extension member in a configuration so that when the elongate extension member is in a vertical position, the rolled up load securing strap will be prevented from falling out of the receiving arrangement.

In one embodiment, the slot is defined by a recess in the receiving arrangement.

In one embodiment, at least part of a periphery of the slot is rounded to prevent cutting and/or abrasion of the strap operationally.

In one embodiment, the strap locating arrangement comprises an elongate extension member.

In one embodiment, the receiving arrangement defines an elongate and straight channel in which a rolled up load securing strap is receivable.

In one embodiment, the receiving arrangement defines an elongate and straight channel comprising an open end and a restricted end.

In one embodiment, the channel comprises an elongate and straight base wall and a pair of side walls.

In one embodiment, the base wall at the restricted end of the elongate and straight channel comprises a rounded back lip configured for preventing abrasion and/or cutting of a load securing strap operationally.

In one embodiment, the receiving arrangement comprises a restriction formation for at least partially restricting movement of a rolled up load securing strap out of the restricted end of the elongate and straight channel.

In one embodiment, a lower portion of the restriction formation comprises a rounded lower lip configured for preventing abrasion and/or cutting of a load securing strap operationally.

In one embodiment, the slot is defined in the restricted end of the elongate and straight channel.

In one embodiment, the receiving arrangement is attachable to an elongate extension member in a configuration so that when the elongate extension member is in a vertical position, a rolled up load securing strap will be prevented from falling out of the receiving arrangement.

In one embodiment, the elongate and straight channel is configured to extend downwardly towards its restricted end when the elongate extension member is in a vertical position.

In one embodiment, the receiving arrangement comprises connection formations for connecting the receiving arrangement to the elongate extension member.

In one embodiment, the receiving arrangement comprises connection formations for removably connecting the receiving arrangement to the elongate extension member.

In one embodiment, the connection formations comprise a receiving formation for receiving the elongate extension member.

In one embodiment, at least part of the receiving formation is configured as a tube.

In one embodiment, the connection formations comprise a securing mechanism for locking the receiving arrangement to the elongate extension member.

In one embodiment, the securing mechanism is a screw thread fastener.

In one embodiment, the screw thread fastener extends through the receiving formation.

According to a further aspect, there is provided a method of deploying a strap over a load on a vehicle load bed using a strap locating arrangement as described above, the method comprising the steps of:
  a. inserting a rolled up load securing strap into a receiving arrangement of a strap locating arrangement;
  b. extending an outer loose end of the rolled up securing strap through a slot in the receiving arrangement in a direction extending tangentially outward from the rolled up strap;

c. impacting the strap locating arrangement against a load located on a vehicle to cause the rolled up load securing strap to roll out of the receiving arrangement over the load.

In one embodiment, the method includes the step of pulling on the outer loose end of the rolled up securing strap in order to reduce an outside diameter of the rolled up securing strap.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

Other aspects of the invention are also disclosed.

BRIEF DESCRIPTION OF THE DRAWINGS

Notwithstanding any other forms which may fall within the scope of the present invention, a preferred embodiment of the invention will now be described, by way of example only, with reference to the accompanying drawings in which.

DESCRIPTION OF EMBODIMENTS

With reference to the above drawings, in which similar features are generally indicated by similar numerals, a strap locating arrangement according to a first aspect of the invention is generally indicated by the numeral 1000.

In one embodiment now described, there is provided a strap locating arrangement 1000 for locating a load securing strap 2000 over a load 3000 that is, for example, located on a vehicle load bed (not shown).

The strap locating arrangement 1000 comprises a receiving arrangement 1100 for receiving at least part of a rolled up load securing strap 2000 in it, and to guide the rolling movement of the rolled up load securing strap 2000 operationally.

The receiving arrangement 1100 preferably comprises an elongate and straight base wall 1110 having parallel opposed edges 1112 and a pair of side walls 1120 extending substantially upwardly from the elongate and straight base wall 1110 at the opposed edges 1112, to define an elongate and straight channel 1130 along which a rolled portion 2100 of the load securing strap 2000 can roll in operation, while being guided by the side walls 1120.

The elongate and straight channel 1130 is not obstructed at open end 1132. However, the receiving arrangement 1100 defines a restriction formation 1140 at a restricted end 1134 of the elongate and straight channel 1130. In operation, the restriction formation 1140 serves to prevent the rolled up load securing strap 2000 from rolling out of the restricted end 1134, while the rolled up portion 2100 of the load securing strap 2000 can be rolled out of the open end 1132 of the elongate and straight channel 1130.

The restriction formation 1140 defines a slot 1200 through which an outer unrolled portion 2200 of the load securing strap 2000 is extendable in a direction that extends tangentially outward from the rolled up load securing strap 2000. In the embodiments shown in the figures, the slot 1200 is configured to receive the outer unrolled portion 2200 of the load securing strap 2000 as it extends along the elongate and straight base wall 1110, although this need not necessarily be the case. Further, in the embodiments shown in the figures, the slot 1200 is also defined by part of a recess 1210 in the receiving arrangement, while in alternative embodiments (not shown), the slot 1200 could be an aperture.

Figure 7:
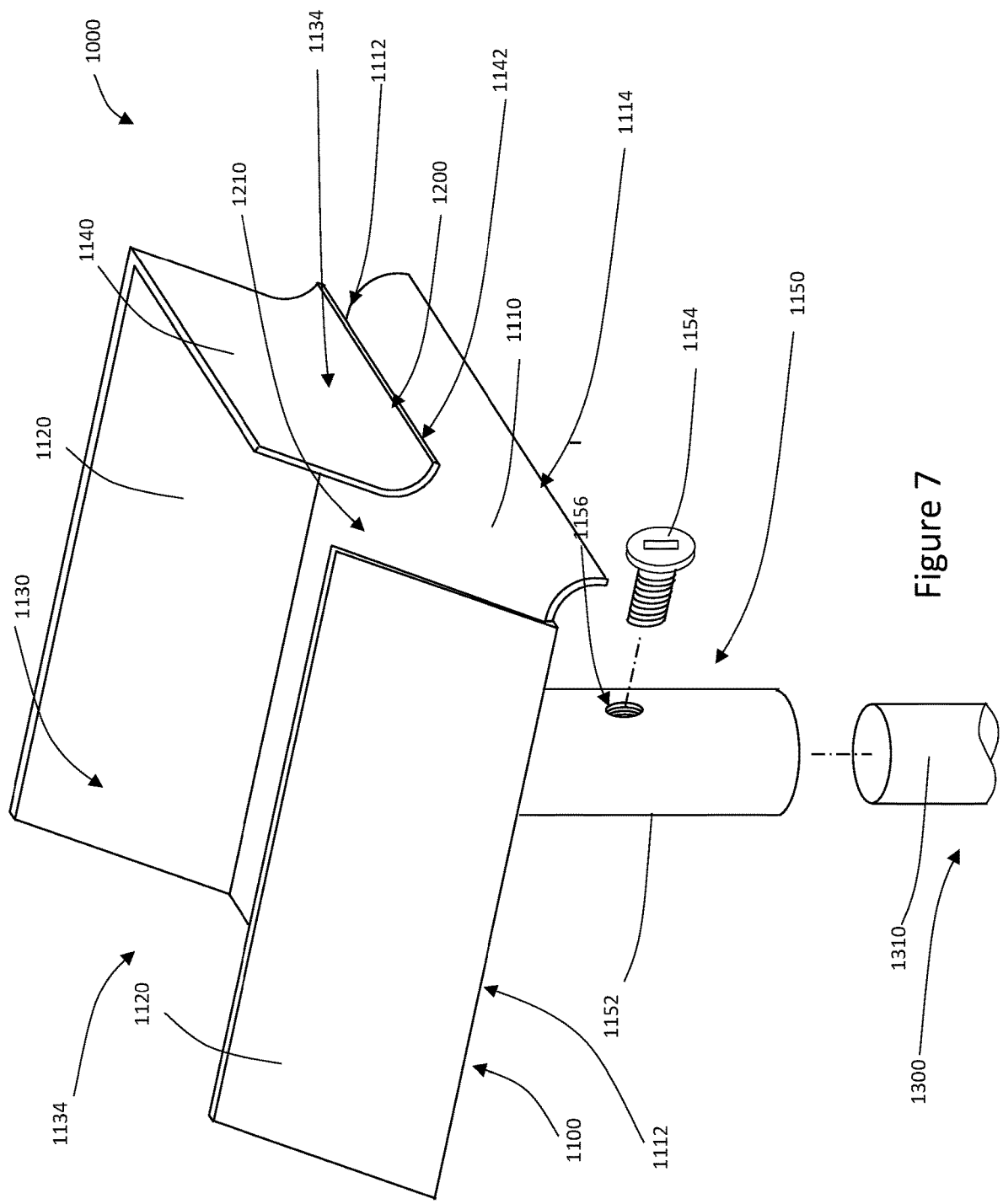
FIG. 7 shows a top perspective assembly view of a second embodiment of a strap locating arrangement.

In one embodiment as shown in FIG. 7, it is the envisaged that the elongate and straight base wall 1110 of the elongate and straight channel 1130 can include a rounded back lip 1114 at the restricted end 1134 of the elongate and straight channel 1130. Further, a lower portion of the restriction formation 1140 can include a rounded lower lip 1142. The rounded back lip 1114 and rounded lower lip 1142 will serve to prevent cutting or abrasion of the load securing strap 2000 when it is pulled through the slot 1200 as will be described in more detail below.

The strap locating arrangement 1000 also comprises an elongate extension member 1300. The receiving arrangement 1100 is configured to be secured to the elongate extension member 1300 by connecting formations 1150. In the embodiment shown in the figures, the connecting formations 1150 comprises a receiving formation in the form of a tube 1152 extending downwardly from the elongate and straight channel 1130, into which an elongate extension member 1300, preferably in the form of a pole 1310, can be received.

Figure 1:
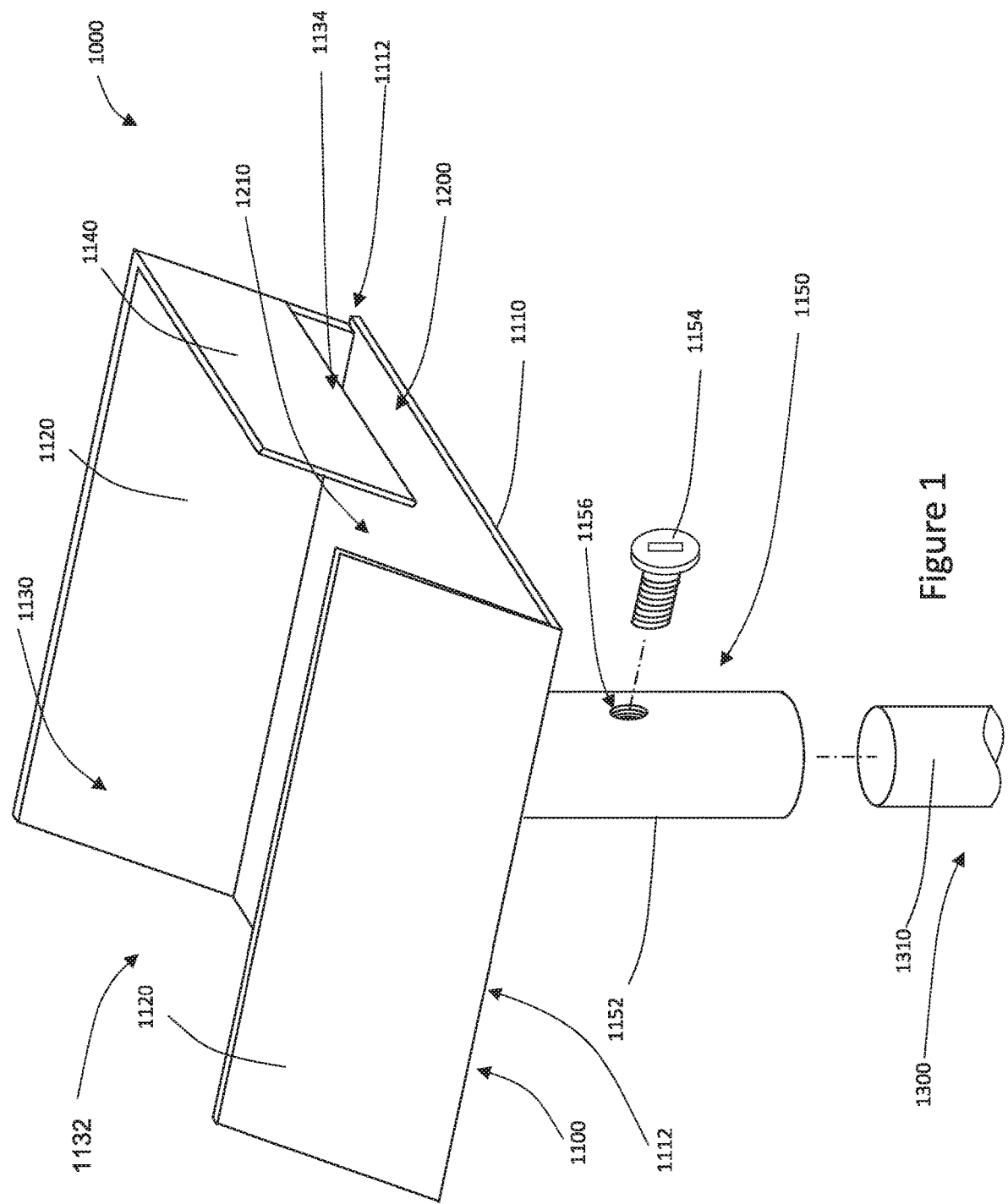
FIG. 1 shows a top perspective assembly view of a first embodiment of a strap locating arrangement.
Figure 2:
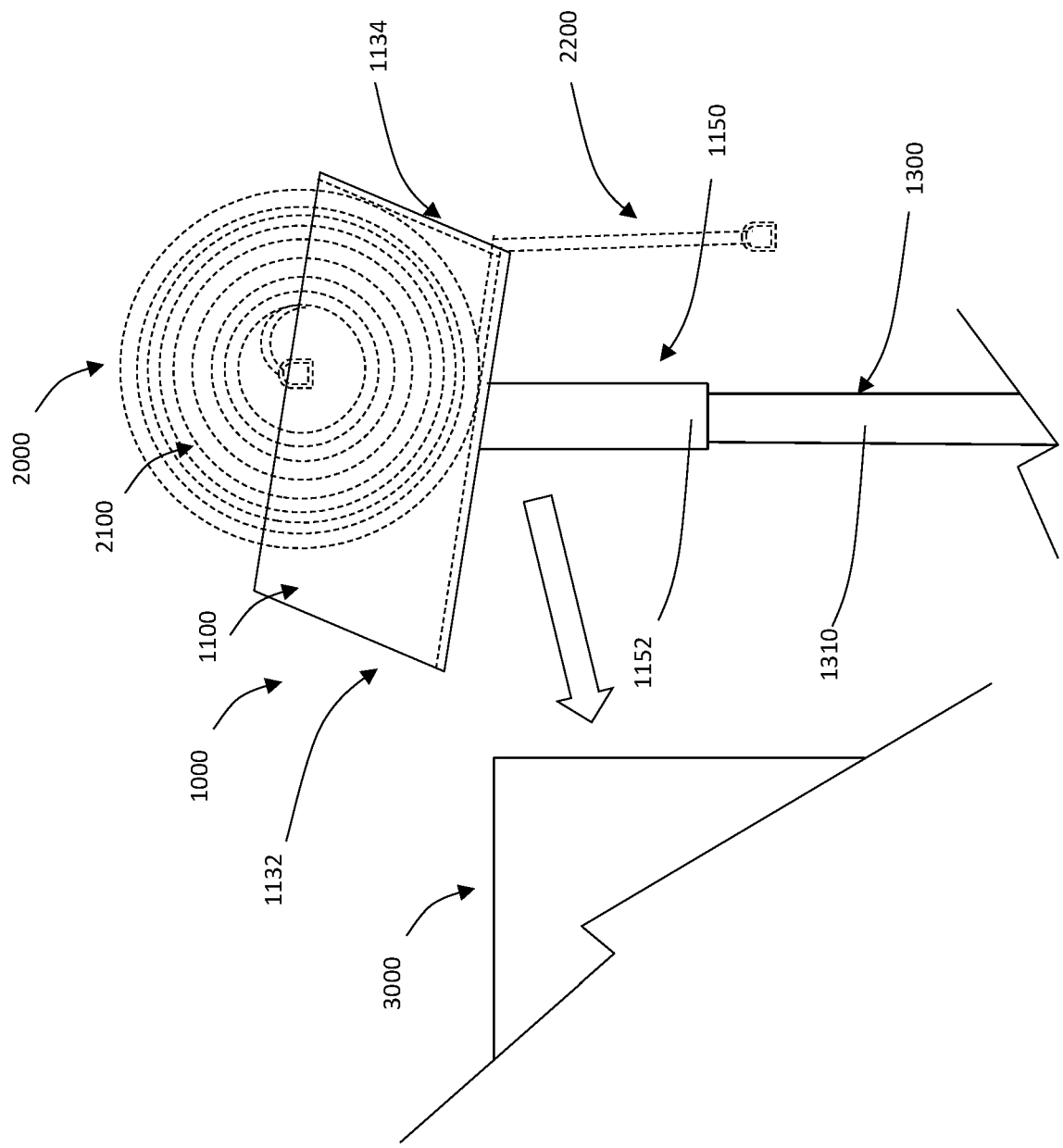
FIG. 2 shows a side view of a first embodiment of a strap locating arrangement with a rolled up load securing strap shown in hidden detail received into the receiving arrangement and a loose end of a load securing strap being received through its slot, the strap locating arrangement being moved towards a load.
Figure 3:
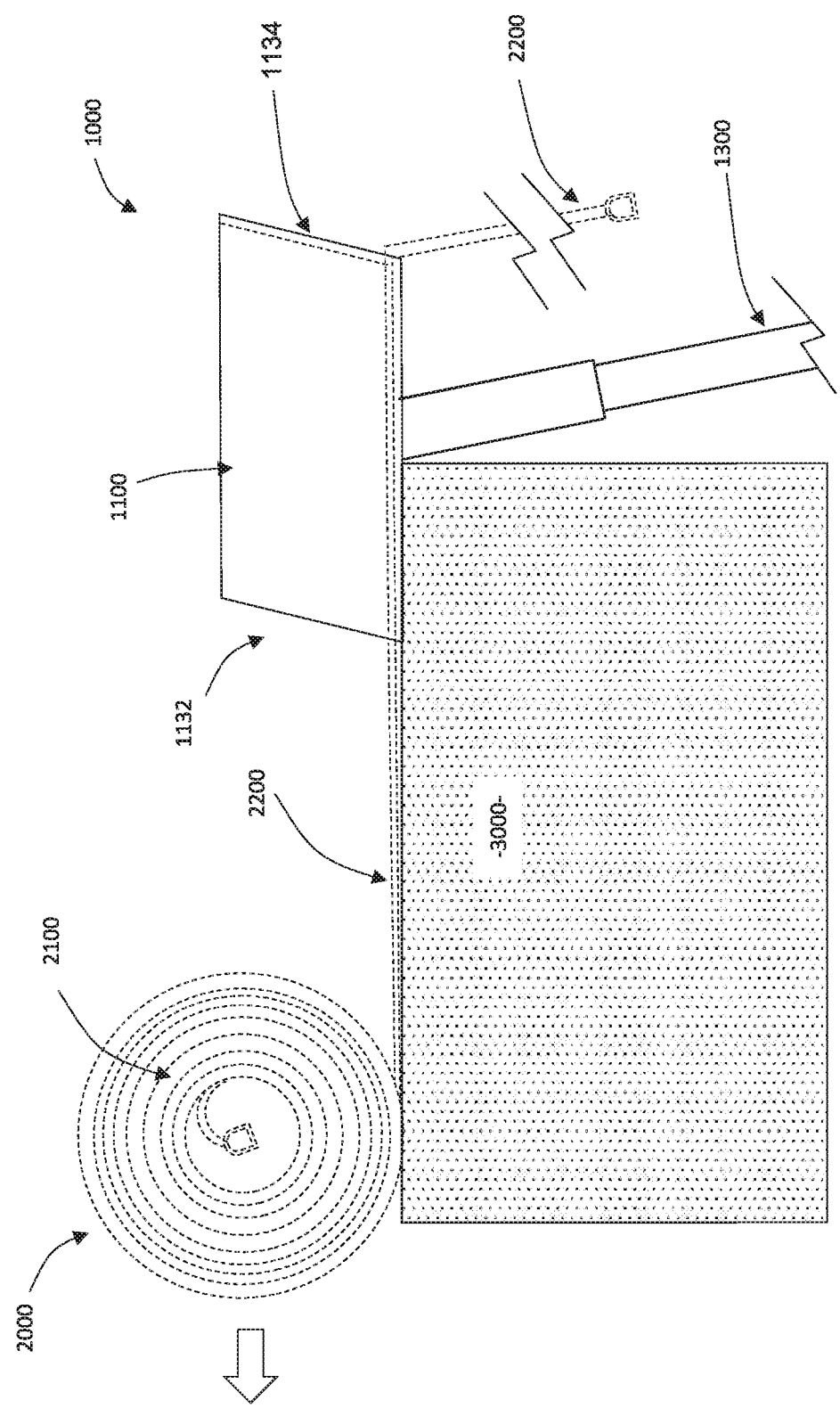
FIG. 3 shows a side view of a first embodiment of a strap locating arrangement with a loose end of a load securing strap shown in hidden detail being received through its slot, with the rolled up load securing strap rolling over the top of a load.

As shown in FIG. 1, the pole 1310 is preferably secured in the tube 1152 by a securing mechanism in the form of a fastener 1154 such as a screw or other threaded formation that extends through a threaded aperture 1156 in the tube 1152. It will be appreciated by those skilled in the art that a wide variety of configurations and formations are possible for removably or permanently securing the receiving arrangement 1100 to the elongate extension member 1300, including but not limited to the use of fasteners, welding, a bayonet formation, or the like. In an alternative embodiment (not shown), the pole 1310 itself can alternatively be threaded and screwed into the tube 1152 to engage with complementary thread formations on the inside of the tube.

Figure 4:
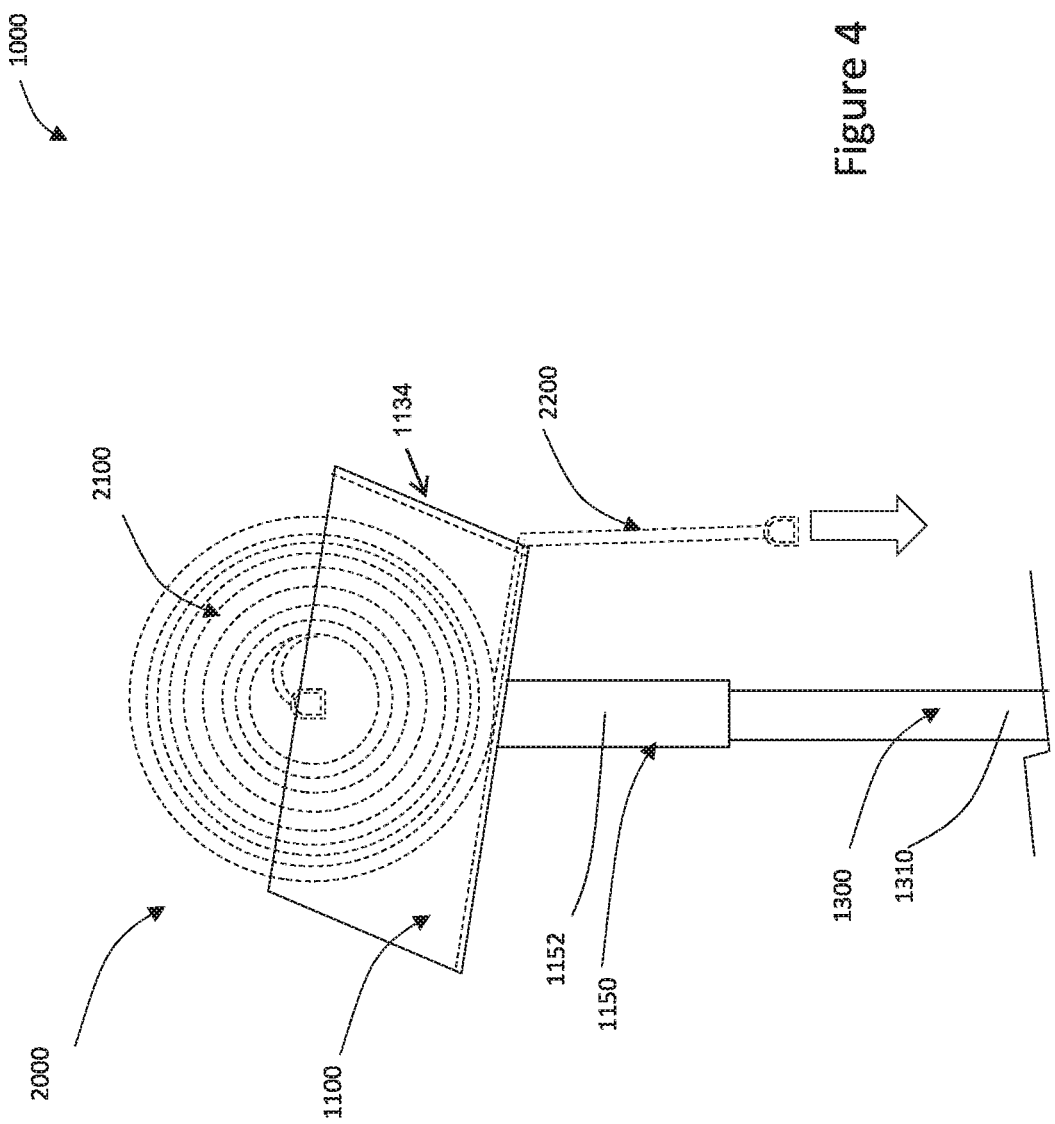
FIG. 4 shows a side view of a first embodiment of a strap locating arrangement with a rolled up load securing strap shown in hidden detail received into the receiving arrangement and a loose end of a load securing strap being received through its slot, with the loose end being pulled downwardly.

As shown in FIG. 4, the receiving arrangement 1100 is attached to the elongate extension member 1300 in a configuration so that when the elongate extension member 1300 is in a vertical position, the elongate and straight channel 1130 is configured to extend downwardly towards its restricted and 1134. However, the rolled up portion 2100 of the load securing strap 2000 will be prevented from falling out of the receiving arrangement 1100 by the restriction formation 1140.

In use, the invention is operated as will be described below.

Initially, the elongate extension member 1300 will be secured to the receiving arrangement 1100, preferably by inserting the pole 1310 into the tube 1152, and securing it in place by driving the fastener 1154 into the threaded aperture 1156 until the fastener firmly engages with the pole 1310.

A rolled up load securing strap 2000 will then be fitted into the elongate and straight channel 1130 of the receiving arrangement 1100 as shown in FIG. 4. Preferably an end of the outer unrolled portion 2200 of the load securing strap 2000 will be fed through the slot 1200, or alternately received into the recess 1210 so that the load securing strap 2000 extends tangentially from the rolled portion 2100 of the load securing strap 2000, and along the elongate and straight base wall 1110 of the receiving arrangement 1100.

The load securing arrangement 1000 is then picked up by the user, while preferably retaining hold of the outer unrolled portion 2200 that extends through the slot 1200. The load securing arrangement 1000 is then moved with some speed towards the top of a load 3000, and is moved substantially sideways to impact against the top of the load 3000 in a position in which the elongate channel 1130 extends over a top edge of the load 3000. As momentum of the load securing arrangement 1000 is stopped against the load 3000, the momentum of the rolled portion 2100 will cause it to continue moving while unrolling itself over the top of the load 3000.

Figure 5:
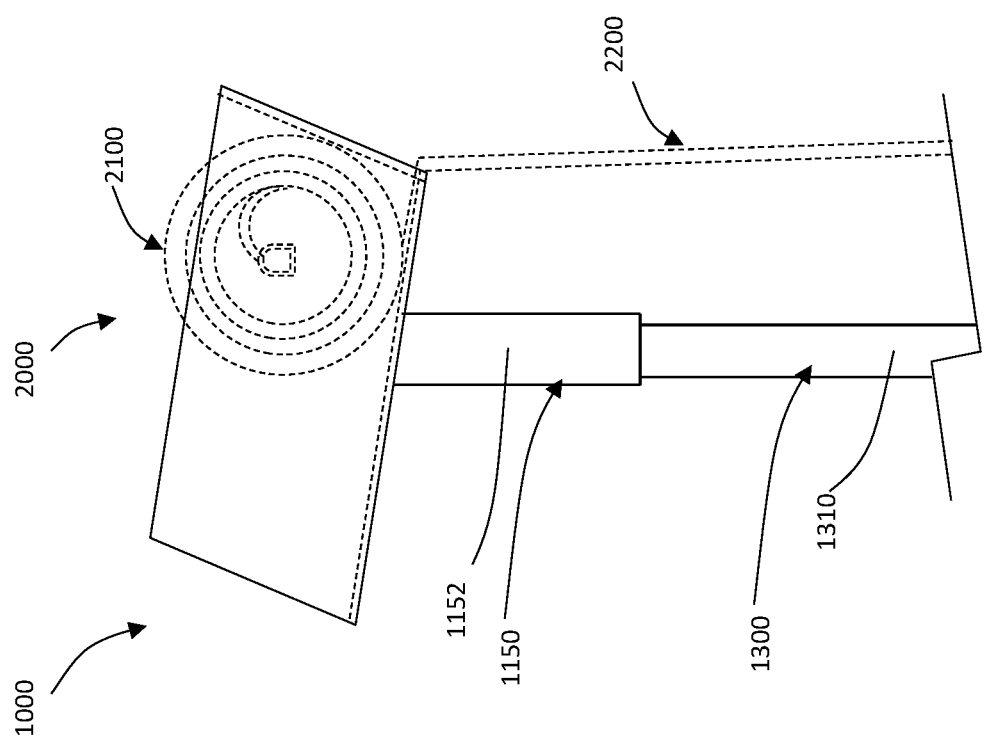
FIG. 5 shows a side view of a first embodiment of a strap locating arrangement with a reduced size rolled up load securing strap shown in hidden detail received into the receiving arrangement and a loose end of a load securing strap being received through its slot, with the loose end having being pulled downwardly relative to FIG. 4.
Figure 6:
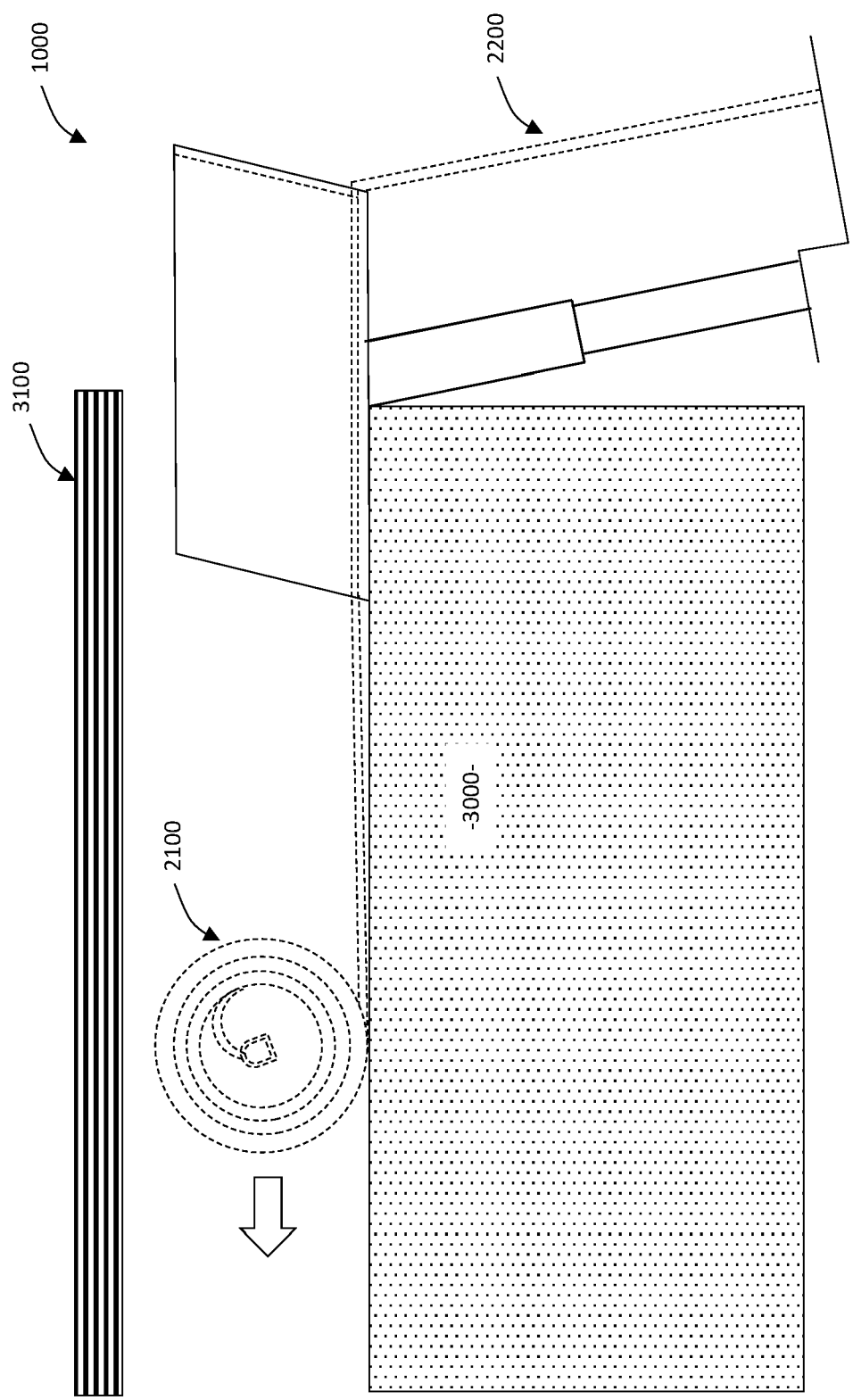
FIG. 6 shows a side view of a first embodiment of a strap locating arrangement shown in hidden detail with a loose end of a load securing strap being received through its slot, with the rolled up load securing strap rolling over the top of a load, and under the roof of a vehicle.

As shown in FIGS. 4-6, if the load is covered by a vehicle roof 3100, leaving only a small gap for the load securing strap 2000 to extend through, then the size or effective diameter of the rolled up portion 2100 of the load securing strap 2000 can be reduced by a user by pulling on the outer unrolled portion 2200 in a direction as shown by the arrow in FIG. 4, to reduce the size of the rolled portion 2100 to the size shown in FIG. 5. This smaller size rolled up portion 2100 will then be small enough to be rolled between the top of the load 3000, and the bottom of the vehicle roof 3100 are shown in FIG. 6.

Interpretation

Chronological Sequence

For the purpose of this specification, where method steps are described in sequence, the sequence does not necessarily mean that the steps are to be carried out in chronological order in that sequence, unless there is no other logical manner of interpreting the sequence.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

As used herein the term "and/or" means "and" or "or", or both.

As used herein "(s)" following a noun means the plural and/or singular forms of the noun.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the transport, logistics and freight industries.

What is claimed is:

1. A strap locating arrangement for locating a strap over a load on a vehicle load bed, the strap locating arrangement comprising
    a) a receiving arrangement configured for receiving at least part of a rolled up load securing strap, the receiving arrangement comprises an elongate and straight base wall having parallel opposed edges and a pair of side walls extending substantially upwardly from the elongate and straight base wall at the opposed edges, the elongate and straight base wall and the pair of side walls defining an elongate and straight channel to receive the rolled up load securing strap and guide rolling of the rolled up load securing strap on the elongate and straight base wall in operation;
    b) the receiving arrangement including a slot through which an un-rolled portion of the load securing strap is extendable in a direction extending tangentially outward from the rolled up strap;
    c) the receiving arrangement being attachable to an elongate extension member in a configuration so that when the elongate extension member is in a vertical position, the rolled up load securing strap will be prevented from falling out of the receiving arrangement.

2. A strap locating arrangement as claimed in claim 1, wherein the slot is defined by a recess in the receiving arrangement.

3. A strap locating arrangement as claimed in claim 1, wherein at least part of a periphery of the slot is rounded to prevent cutting and/or abrasion of the strap operationally.

4. A strap locating arrangement as claimed in claim 1, wherein the strap locating arrangement comprises an elongate extension member.

5. A strap locating arrangement as claimed in claim 4, wherein the elongate and straight channel comprises an open end and a restricted end.

6. A strap locating arrangement as claimed in claim 5, wherein the elongate and straight base wall at the restricted end of the elongate and straight channel comprises a rounded back lip configured for preventing abrasion and/or cutting of a load securing strap operationally.

7. A strap locating arrangement as claimed in claim 5, wherein the receiving arrangement comprises a restriction formation for at least partially restricting movement of a rolled up load securing strap out of the restricted end of the elongate and straight channel.

8. A strap locating arrangement as claimed in claim 7, wherein a lower portion of the restriction formation comprises a rounded lower lip configured for preventing abrasion and/or cutting of a load securing strap operationally.

9. A strap locating arrangement as claimed in claim 8, wherein the slot is defined in the restricted end of the elongate and straight channel.

10. A strap locating arrangement as claimed in claim 9, wherein the elongate and straight channel is configured to extend downwardly towards its restricted end when the elongate extension member is in a vertical position.

11. A strap locating arrangement as claimed in claim 1, wherein the receiving arrangement comprises connection formations for connecting the receiving arrangement to the elongate extension member.

12. A strap locating arrangement as claimed in claim 11, wherein the receiving arrangement comprises connection formations for removably connecting the receiving arrangement to the elongate extension member.

13. A strap locating arrangement as claimed in claim 11, wherein the connection formations comprise a receiving formation for receiving the elongate extension member.

14. A strap locating arrangement as claimed in claim 13, wherein at least part of the receiving formation is configured as a tube.

15. A strap locating arrangement as claimed in claim 13, wherein the connection formations comprise a securing mechanism for locking the receiving formation to the elongate extension member.

16. A strap locating arrangement as claimed in claim 15, wherein the securing mechanism is a screw thread fastener.

17. A strap locating arrangement as claimed in claim 16, wherein the screw thread fastener extends through the receiving formation.

18. A method of deploying a strap over a load on a vehicle load bed using a strap locating arrangement as defined in claim 1, the method comprising the steps of:
    a) inserting a rolled up load securing strap into a receiving arrangement of a strap locating arrangement;
    b) extending an outer loose end of the rolled up securing strap through a slot in the receiving arrangement in a direction extending tangentially outward from the rolled up strap;
    c) impacting the strap locating arrangement against a load located on a vehicle to cause the rolled up load securing strap to roll out of the receiving arrangement over the load.

19. A method as claimed in claim 18, wherein the method includes the step of pulling on the outer loose end of the rolled up securing strap in order to reduce an outside diameter of the rolled up securing strap.

* * * * *